UNITED STATES PATENT OFFICE.

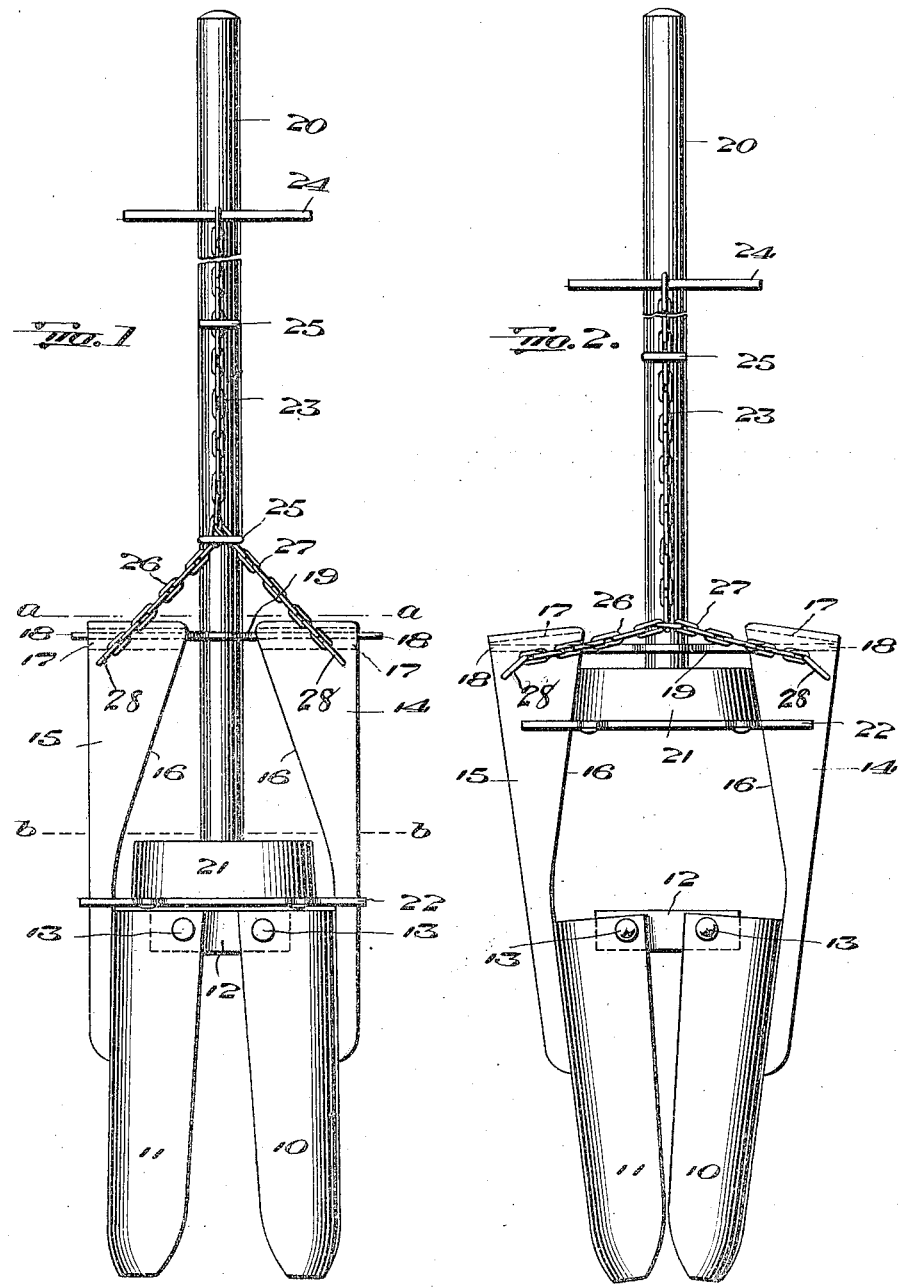

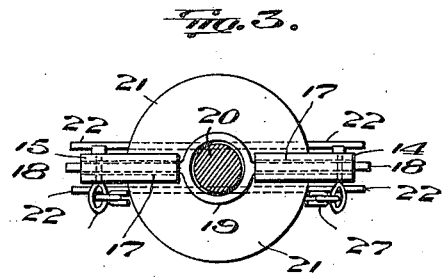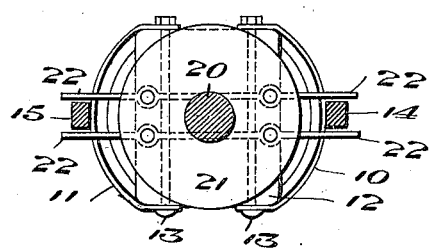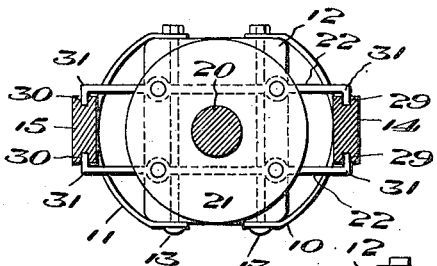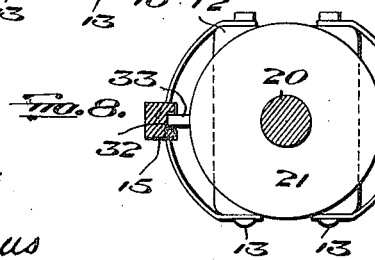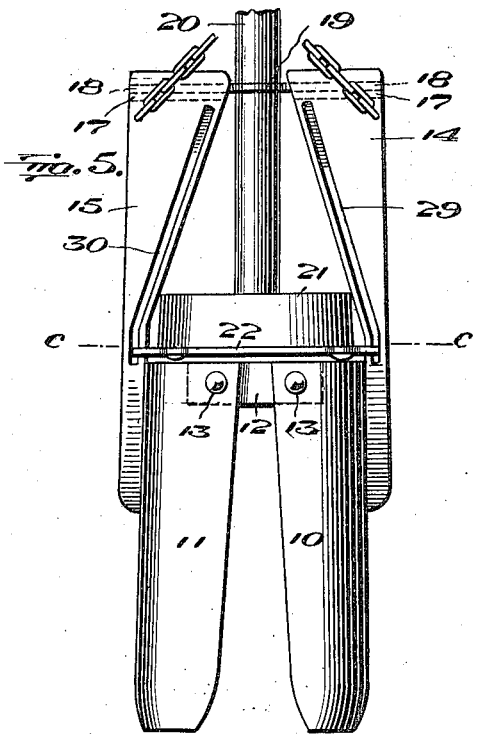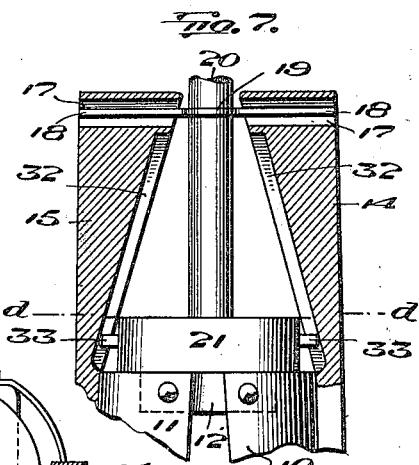

PHILIP J. MALBON, JR., OF NORFOLK, VIRGINIA.

POST-HOLE DIGGER.

1,322,920.  Specification of Letters Patent.  Patented Nov. 25, 1919.

Application filed May 11, 1918.  Serial No. 233,985.

*To all whom it may concern:*

Be it known that I, PHILIP J. MALBON, Jr., a citizen of the United States, residing at Norfolk, in the county of Norfolk and State of Virginia, have invented new and useful Improvements in Post-Hole Diggers, of which the following is a specification.

This invention relates to new and useful improvements in post hole diggers and more particularly to those known as the pivoted-jaw type in which the cutting members, comprising two substantially semicircular sheet metal plates, having cutting edges formed on their lower ends, are pivotally mounted upon a head block and adapted to be held in open position when the digger is forced into the ground to loosen the dirt, and then brought together to tightly clamp the dirt when it is to be removed from the hole.

The main object of my invention is to provide a more simple, durable and efficient digger having a single handle and one that is simple in construction, and more easily operable than the old and customary digger having a handle for each one of the pivoted jaw members.

Various other objects and modifications will be brought out in the following specification and illustrated in the accompanying drawings, in which like numerals and characters represent like parts throughout the different figures.

In the drawings:

Figure 1 is a side elevation of my digger in open position, preparatory to being driven into the ground.

Fig. 2 is a side elevation of the same, showing the jaws in closed position.

Fig. 3 is a sectional view on the line *a—a*, Fig. 1.

Fig. 4 is a sectional view on the line *b—b*, Fig. 1.

Fig. 5 is a side elevation showing a modification of the lever arms mounted on the cutting members.

Fig. 6 is a sectional view on the line *c—c*, Fig. 5, illustrating inturned ends on the guide rods and the channels in the lever arms for the reception of the inturned ends.

Fig. 7 shows a further modification, in which channels are formed on the inner faces of the lever arms for the reception of the single guide rods secured to each side of the driving head.

Fig. 8 is a sectional view on the line *d—d*, Fig. 7.

I will now describe my digger in more minute detail, as shown in the drawings, in which the cutter blades 10 and 11 are pivotally mounted upon a block 12, by means of the bolts 13 passing entirely through the block 12, and having lever arms 14 and 15, provided with cam faces 16, secured in any suitable manner upon the upper edge of the blades. The upper ends of the lever arms 14 and 15 have holes 17, shown in dotted lines, passing through the upper ends thereof, for the reception of the ends 18 of the yoke 19, through which in turn the handle 20 of the digger passes.

The handle 20 has secured, either permanently or detachably, to its lower end a blade-operating disk 21, having guide rods 22 fastened to its under face by any suitable means, although in the present instance the fastening is disclosed as comprising loops formed in the rods, through which nails, screws, or bolts may be passed. These rods 22 are so arranged across the face of the disk 21 that they are parallel and extend slightly beyond the outer edges of the lever arms 14 and 15 when the blades 10 and 11 are in open position.

A chain 23 having a hand piece 24 secured to its upper end and passing through suitable eyes 25, secured to the handle 20, has its lower end divided so that chains 26 and 27 will connect the lower end of chain 23 with the tops of both of the lever arms 14 and 15 in which eye bolts 28 are secured to provide terminals for said chains.

One modification of my digger is disclosed in Figs. 5 and 6, in which the lever arms 14 and 15 are shown provided with slots 29 and 30 formed in both faces thereof to receive the inturned ends 31 of the guide rods 22, while a further modification, of much simpler construction, is shown in Figs. 7 and 8. In this form the inner faces of the lever arms 14 and 15 are each provided with a single slot 32 for the reception of single guide rods 33 secured in any suitable manner to the sides of the blade operated disk 21. All of the different forms of guide rods shown have the same general function, namely, to retain the operating disk 21 in proper position with relation to the lever arms 14 and 15 attached to the cutter blades 10 and 11.

To better illustrate the advantages of my digger I will now describe the manner of operation. Previous to the insertion of the digger into the ground the cutting blades 10 and 11 must be brought into open position, as shown in Fig. 1, and this is accomplished by drawing the upper ends of the lever arms 14 and 15 together by means of the chain 23. Assuming the digger has just been drawn from the hole with a charge of dirt therein, the operator while grasping the handle 20 in one hand pulls up on the chain 23 with the other. This will force the blade operating disk 21 down against the head block 12 and allow the lever arms to be brought together by the action of chain 23 on the two short sections 26 and 27, the arms 18 on the yoke 19 acting as guides for the lever arms 14 and 15 in their movement. As the arms are connected to the cutting blades 10 and 11, and these in turn pivoted on the head block 12 by bolts 13, it is readily seen that the above described movements quickly release the dirt and prepare the digger for another load. When the digger has been again inserted into the hole and the operator wishes to withdraw a quantity of earth, he releases the chain 23 and by pulling up on the handle 20 causes the lever arms 14 and 15 to be forced outwardly by the upward motion of the blade operating disk 21 against the cam faces of the said arms, the guide rods 22 in each instance holding the disk 21 in proper relation to the lever arms 14 and 15.

The several modifications shown relate entirely to the manner of mounting the guide rods 22 in relation to the lever arms 14 and 15, and the method of operation would be the same no matter which construction were used.

Having now described my invention in detail, what I claim as new is:—

1. In a device of the class described and in combination, two pivotally mounted cutting blades, cam members carried by said blades, a handle having a cam member coöperating with the cam members of said blades and movable relative thereto, and means for moving the blades relative to said handle.

2. In a device of the class described and in combination, two pivotally mounted cutting blades, lever arms secured to the cutting blades, cam surfaces on the lever arms, a handle, and means on the handle for engagement with said cam surfaces for opening and closing the cutting blades.

3. In a device of the class described and in combination, a head block, two cutting blades pivotally mounted on said head block, lever arms secured to the upper edges of the cutting blades, cam surfaces on the lever arms, a handle, a cam operating disk mounted upon the handle, and means carried by the handle for effecting relative movement between the disk and lever arms for opening and closing the cutting blades.

4. In a device of the class described and in combination, a head block, two cutting blades pivotally mounted upon the head block, lever arms secured to the upper edges of the cutting blades, cam surfaces on the lever arms, a handle, a cam operating disk on the handle adapted to close the cutting blades when the handle is moved upward, guiding means between the handle and the lever arms, and means for opening the cutting blades when said blades have been closed by the upward motion of the handle.

5. In a device of the class described and in combination, a head block, two cutting blades pivotally mounted upon the head block, lever arms secured to the upper edges of the cutting blades, cam surfaces on the lever arms, a handle, a cam operating disk mounted upon the handle, guiding means between the handle and the lever arms, means for retaining the cam operating disk in proper relation with the lever arms, and means for opening the cutting blades.

6. In a device of the class described and in combination, a head block, two cutting blades pivotally mounted upon the head block, lever arms secured to the cutting blades, cam surfaces on the lever arms, a handle, a cam operating disk mounted upon the handle, a yoke mounted upon the handle for associating said handle with the lever arms, means for retaining the cam operating disk in proper relation with the lever arms and means for opening the cutting blades.

7. In a device of the class described and in combination a head block, two cutting blades pivotally mounted upon the head block, lever arms secured to the upper edges of the cutting blades, cam surfaces on the inner edges of the lever arms, a handle, a cam operating member mounted upon the handle, a yoke mounted upon the handle for associating said handle with the lever arms, slots formed in the lever arms, means on the cam operating member for engagement with said slots and means mounted upon the handle for opening the cutting blades.

8. In a device of the class described and in combination, a head block, two cutting blades pivotally mounted upon said head block, lever arms secured to the upper edges of the cutting blades, cam surfaces on the inner edges of the lever arms, a handle, a yoke carried by said handle for guiding the lever arms, a cam operating disk mounted upon the handle, slots formed in the lever arms, guide rods on the cam operating disk for engagement with the slots to retain said disk in proper relation to the lever arms, and means for opening the cutting blades.

9. In a device of the class described and in combination, a head block, two cutting blades pivotally mounted upon the head block, lever arms secured to the cutting blades and having holes through their upper ends, cam surfaces on the inner edges of the lever arms, a handle, a yoke carried upon the handle, arms upon the yoke passing through the holes in the upper ends of the lever arms, a cam operating member mounted upon the handle, slots formed in the surfaces of the lever arms, guide rods on the cam operating member for engagement with the slots and a flexible member carried by the handle and connected to the lever arms to open the cutting blades.

In testimony whereof I have hereunto set my hand in presence of two subscribing witnesses.

PHILIP J. MALBON, Jr.

Witnesses:
 IVOR A. PAGE,
 IVOR A. PAGE, Jr.